(12) United States Patent
McGrath

(10) Patent No.: US 7,222,411 B1
(45) Date of Patent: May 29, 2007

(54) METHOD OF INTERCONNECTING A LOAD/UNLOAD RAMP ASSEMBLY WITH A BASE PLATE OF A DISK DRIVE

(75) Inventor: Michael C. McGrath, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 226 days.

(21) Appl. No.: 11/125,040

(22) Filed: May 9, 2005

Related U.S. Application Data

(62) Division of application No. 10/027,907, filed on Dec. 21, 2001, now Pat. No. 6,927,943.

(60) Provisional application No. 60/269,760, filed on Feb. 16, 2001.

(51) Int. Cl.
G11B 5/127 (2006.01)
G11B 5/54 (2006.01)

(52) U.S. Cl. .............................. 29/603.03; 29/603.04; 29/525.01; 29/525.11; 360/254.7

(58) Field of Classification Search ............ 29/603.03, 29/603.04, 525.01, 525.11; 360/254.7, 254.8, 360/254.9
See application file for complete search history.

(56) References Cited

U.S. PATENT DOCUMENTS

| | | | | |
|---|---|---|---|---|
| 5,673,157 A | * | 9/1997 | Ycas et al. ............... | 360/97.01 |
| 5,831,795 A | * | 11/1998 | Ma et al. ................. | 360/254.3 |
| 5,995,330 A | | 11/1999 | Furay et al. ............. | 360/254.7 |
| 6,057,988 A | | 5/2000 | Berberich et al. ....... | 360/254.9 |
| 6,091,577 A | | 7/2000 | Ho et al. ................. | 360/254.9 |
| 6,181,528 B1 | | 1/2001 | Reinhart et al. ......... | 360/254.7 |
| 6,201,665 B1 | | 3/2001 | Angellotti et al. ....... | 360/255.7 |
| 6,226,154 B1 | * | 5/2001 | Albrecht .................. | 360/254.8 |
| 6,243,222 B1 | * | 6/2001 | Boutaghou et al. ...... | 360/73.03 |
| 2002/0039258 A1 | | 4/2002 | Noda ....................... | 360/254.7 |

* cited by examiner

Primary Examiner—A. Dexter Tugbang
Assistant Examiner—Tai Van Nguyen
(74) Attorney, Agent, or Firm—James L. Johnson

(57) ABSTRACT

The present invention is directed to a load/unload ramp assembly which is interconnectable with a base plate of a dynamic load/unload-type disk drive. The load/unload ramp assembly generally includes a load/unload ramp and at least one base plate attachment cantilever. A fastener shaft is directed past each of the base plate attachment cantilevers and into a fastener receptacle on the base plate. A fastener head simultaneously exerts a force on each of the base plate attachment cantilevers that are engaged by the head to deflect such base plate attachment cantilevers toward the base plate, to in turn dispose the load/unload ramp assembly in forcible engagement with the base plate.

10 Claims, 4 Drawing Sheets

METHOD OF INTERCONNECTING A LOAD/UNLOAD RAMP ASSEMBLY WITH A BASE PLATE OF A DISK DRIVE

CROSS-REFERENCE TO RELATED APPLICATIONS

This patent application is a divisional of and claims priority under 35 U.S.C. § 120 to U.S. patent application Ser. No. 10/027,907, now U.S. Pat. No. 6,927,943 that was filed on Dec. 21, 2001, and that is entitled "ATTACHMENT METHOD AND APPARATUS FOR LOAD/UNLOAD RAMP OF A DYNAMIC LOAD DISK DRIVE", and further claims priority from U.S. Patent Application Ser. No. 60/269,760, that was filed on Feb. 16, 2001, and that is entitled a "ATTACHMENT METHOD FOR LOAD/UNLOAD RAMP." The entire disclosures of both U.S. Patent Application Ser. No. 60/269,760 and U.S. patent application Ser. No. 10/027,907 are incorporated by reference herein.

FIELD OF THE INVENTION

The present invention generally relates to dynamic load/unload-type disk drives and, more particularly, to the manner of interconnecting a load/unload ramp with a base plate of the disk drive.

BACKGROUND OF THE INVENTION

Conventional dynamic load/unload-type disk drives typically include a base plate and a cover that is detachably connected to the base plate to define a housing for various disk drive components. One or more data storage disks are generally mounted on a spindle which is interconnected with the base plate and/or cover so as to allow the data storage disk(s) to rotate relative to both the base plate and cover via a spindle motor. An actuator arm assembly (e.g., a single rigid actuator arm, a plurality of rigid actuator arms, an E-block with a plurality of rigid actuator arm tips), is interconnected with the base plate and/or cover so as to allow the actuator arm assembly to move relative to both the base plate and cover in a controlled manner. This motion is either typically a pivoting or a linear motion.

A suspension or load beam may be provided for each data storage surface of each data storage disk. Typically each disk has two of such surfaces. All suspensions are appropriately attached to and extend away from the actuator arm assembly in the general direction of the data storage disk(s) during normal operations. A transducer, such as a read/write head, is carried by a slider that is disposed on the free end of each suspension. Signals are exchanged between the head and the corresponding data storage disk to read and/or write information. The position of the actuator arm assembly, and thereby each transducer, is controlled by a voice coil motor or the like which moves the actuator arm assembly to dispose the head(s) at the desired radial position relative to the corresponding data storage disk.

The head(s) of the disk drive is parked off its corresponding data storage disk by using a load/unload ramp. The load/unload ramp is typically disposed at least toward (and possibly beyond) the perimeter of the corresponding data storage disk. Load/unload ramps may be made from plastic to reduce material costs, and are nonetheless attached to the base plate. It is desirable to have the load/unload ramp demonstrate good wear characteristics as the suspension/slider moves along the ramp. Moreover, it is desirable for the load/unload ramp to tolerate the increased temperatures that exist within the disk drive housing during disk drive operations. Certain plastics may have a tendency to creep at these temperatures, particularly over those areas of the load/unload ramp that are stressed by the attachment of the load/unload ramp to the base plate. "Creeping" refers to a progressive deformation over a period of time due to a material being under a constant load or stress. This time dependent deformation has proven to be a limiting factor in the operational integrity of at least certain designs of load/unload ramps that are formed from plastic.

Creeping of a plastic load/unload ramp may have a number of undesired effects. For example, if the plastic load/unload ramp is attached to the base plate using a screw, over time, creeping of the ramp plastic may loosen the screw and result in the screw failing to adequately secure the load/unload ramp to the base plate. This problem has been addressed in a number of ways. A common practice to combat creeping has included insert-molding a metal plate into the plastic load/unload ramp to increase the integrity of the attachment of the ramp to the base plate. However, this addition of a metal plate to the load/unload ramp can more than double the cost of producing such ramps. Another attempt at solving the problem of creeping reflects using a screw in combination with locking devices to attach the plastic load/unload ramp to the base plate. However, locking devices such as thread locks not only add cost, but also add the risk of outgassing (i.e., the vaporization of materials from one or more surfaces of the thread locks after they are placed in low pressure environments during disk drive operations). Further, locking devices such as lock-washers add cost, create particulates, and may require a more expensive grade of ramp plastic for compatible use. While suitable plastics with improved creep characteristics are known, they are significantly more expensive than even the attempted improved attachment methods. Therefore, it would be desirable to have a load/unload ramp of a configuration that reduces manufacturing costs, provides a use-life that is greater than that of conventional ramps, and/or that reduces the effect of creep in relation to the attachment of the load/unload ramp to the base plate.

SUMMARY OF THE INVENTION

The present invention is generally directed to dynamic load/unload-type disk drives. More specifically, the present invention is generally directed to a load/unload ramp assembly for use with a compatible base plate of a dynamic load/unload-type disk drive, which may utilize one or more heads/data storage disks. That is, the present invention is equally applicable to single and multiple head disk drive configurations. The design/configuration of the load/unload ramp assembly of the present invention desirably addresses the interconnection of the load/unload ramp assembly to the base plate in a manner that is not significantly adversely affected by the elevated temperatures that exist within the disk drive housing during disk drive operations. Accordingly, the design/configuration of any appropriate dynamic load/unload-type disk drive may benefit from the installation of a load/unload ramp assembly of the present invention in a manner that will now be described.

Generally, the present invention is embodied in a load/unload ramp assembly that has at least one deflectable member that is deflected toward an underlying portion of a base plate to force the load/unload ramp assembly into engagement with the base plate. That is, any such deflectable member will initially be spaced from an underlying portion of the base plate, and then deflected toward the base plate to force the load/unload ramp assembly into engagement with the base plate. Typically, this deflection will be accomplished using one or more appropriate fasteners. Any appropriate configuration may be used for each deflectable member of the noted type. Therefore, although the present invention is hereafter described in relation to this deflectable member being a "base plate attachment cantilever," other types of deflectable members could be substituted therefore. For instance, another example of an appropriate configuration for a deflectable member that is encompassed by the present invention is a simple beam structure that is supported at two spaced locations.

A first aspect of the present invention is embodied by a load/unload ramp assembly that is interconnectable with a base plate of a disk drive. The load/unload ramp assembly generally has a ramp body that includes a load/unload ramp and at least one base plate attachment cantilever that may be deflected at least generally toward the base plate when engaged by at least one appropriate fastener. This deflection of the base plate attachment cantilever(s) forcibly engages the load/unload ramp assembly with the base plate to appropriately interconnect the same.

Various refinements exist regarding the features noted in relation to the subject first aspect of the present invention. Additional features may also be incorporated in the subject first aspect of the present invention as well. These refinements and additional features may exist individually or in any combination. The load/unload ramp assembly of the first aspect may be utilized with any base plate configuration that allows the load/unload ramp assembly to be secured thereto by a deflection of at least one base plate attachment cantilever. Typically, each fastener that is used to secure the load/unload ramp assembly to this base plate will have a corresponding fastener receptacle that is formed on a surface of the base plate that projects toward the load/unload ramp assembly when installed thereon. This base plate may include a number of additional features, which will be discussed in more detail below in relation to the second aspect.

Preferably, at least two base plate attachment cantilevers are utilized by the first aspect, and such will be referred to as first and second base plate attachment cantilevers. Characteristics of these first and second base plate attachment cantilevers that are hereafter described in relation to the first aspect may be utilized by each base plate attachment cantilever utilized by the first aspect, including where only a single base plate attachment cantilever is utilized by the first aspect. The first and second base plate attachment cantilevers may extend at least generally toward each other or a common point, and have respective first and second free ends. These first and second free ends may be disposed in spaced relation to generally define at least a portion of a fastener aperture so that a shaft of a fastener can pass by/between the first and second free ends. Additionally, the spaced relation of the first and second free ends of the first and second base plate attachment cantilevers makes it possible for the head of the fastener to simultaneously exert a force on the first and second base plate attachment cantilevers. It should be appreciated that side portions of the first and second base plate attachment cantilevers could also be disposed in space relation so as to allow a fastener to pass therebetween. In any case, upon the load/unload ramp assembly being installed on the base plate and the head of a particular fastener exerting a force on at least the first and second base plate attachment cantilevers, these first and second base plate attachment cantilevers are generally deflected toward the base plate to forcibly engage the load/unload ramp assembly with the base plate, and thereby to secure the load/unload ramp assembly to the base plate.

The first and second base plate attachment cantilevers that may be associated with the first aspect may be generally disposed in opposing relation. In other words, the first base plate attachment cantilever may be positioned at or define a first portion of a fastener aperture, and the second base plate attachment cantilever may be positioned at or define a second portion of this fastener aperture that is directly opposite the first portion. The ramp body can have at least one aperture shelf positioned about the fastener aperture and recessed relative to an upper surface of each base plate attachment cantilever. Some variations of the first aspect include both the first and second base plate attachment cantilevers and first and second aperture shelves. In such variations, the first and second base plate attachment cantilevers may be positioned in opposing relation, and the first and second aperture shelves may be disposed in opposing relation. In one embodiment, a reference line connecting the first and second base plate attachment cantilevers is generally perpendicular to a reference line connecting the first and second aperture shelves. Preferably, the intersection point of these two reference lines generally corresponds with a central portion of the fastener aperture of the load/unload ramp assembly.

Multiple base plate attachment cantilevers may be utilized in any manner in relation to the first aspect (e.g., arranged in variety of configurations). For instance, multiple base plate attachment cantilevers may be utilized without collectively defining a fastener aperture therebetween. For instance, each base plate attachment cantilever could be deflected by its own fastener(s). That is, each base plate attachment cantilever may have its own fastener or set of fasteners. However and as noted above, a particular fastener may simultaneously act on multiple base plate attachment cantilevers. Any combination of base plate attachment cantilevers and fasteners may be used in relation to the first aspect. What is of importance is that any fastener that is utilized by the first aspect to engage the load/unload ramp assembly against the base plate does so by deflecting one or more base plate attachment cantilevers toward the base plate.

Any base plate attachment cantilever that is utilized by the first aspect may be arranged in any appropriate fashion on the load/unload ramp assembly. For instance, a given base plate attachment cantilever may be disposed interiorly of a perimeter of the load/unload ramp assembly. Moreover, a given base plate attachment cantilever may be disposed on a perimeter of the load/unload ramp assembly for deflection by an appropriate fastener(s). The shaft of this fastener could extend through the load/unload ramp assembly, or could be disposed beyond the load/unload ramp assembly, so long as part of this fastener could still engage at least one base plate attachment cantilever to deflect the same in the manner described herein.

Any of the base plate attachment cantilevers that may be associated with the first aspect can each include one or more fastener head contact protrusions or pads that are positioned on the upper surface of the corresponding base plate attachment cantilever. In variations having such fastener head contact protrusions, each fastener head contact protrusion may be positioned at least generally at a free end of the corresponding base plate attachment cantilever. In other words, since a "cantilever" generally refers to a projecting structure that is attached or supported at only one end, each fastener head contact protrusion may be generally disposed at an end of the respective attachment cantilever which is substantially free from attachment to and/or support from the ramp body. However, it should be appreciated that any such fastener head contact protrusion may be disposed anywhere on the corresponding base plate attachment cantilever for engagement by the corresponding fastener(s). Preferably, a given base plate attachment cantilever has a pair of the noted fastener head contact protrusions so as to "cradle" the head of the fastener that is engaged therewith to attach the load/unload ramp assembly to the disk drive base plate. In variations of this first aspect which include such fastener head contact protrusions, these fastener head contact protrusions are ideally positioned on the corresponding base plate attachment cantilever so as to distribute the axial force of the fastener to locations on the respective base plate attachment cantilevers that cause minimum physical distortion of the load/unload ramp assembly.

In one embodiment of the first aspect, a major axis of a given base plate attachment cantilever is disposed at an angle relative to horizontal prior to being engaged by the base plate attachment fastener. That is, the free end of a given base plate attachment cantilever may be disposed at a higher elevation than its corresponding fixed end. In addition, a given base plate attachment cantilever may have a lower surface that extends at least generally upwardly progressing toward its corresponding free end. Stated another way, in one embodiment of the first aspect, an upper surface of a given base plate attachment cantilever is disposed in non-parallel relation with a corresponding lower surface of the base plate attachment cantilever. Features, such as serrations or the like, may be formed on the lower surface of each base plate cantilever to enhance the engagement with the underlying disk drive base plate when attached thereto.

A second aspect of the present invention includes a disk drive having a base plate, a load/unload ramp assembly of the type discussed above in relation to the first aspect, and at least one fastener that secures this load/unload ramp assembly to the base plate. The base plate generally has a first surface and preferably at least one boss (that is, a boss is not required by the second aspect). Each boss projects away from the first surface, and at least one fastener receptacle is formed in the base plate (on/through a corresponding boss when utilized by the second aspect). A fastener is typically provided for each fastener receptacle and includes a head and a shaft. The shaft of each fastener extends past at least one base plate attachment cantilever (for example, an end thereof; a side thereof) and is generally securely disposed within a corresponding fastener receptacle of the base plate. Accordingly, the head of each fastener exerts a force on at least one base plate attachment cantilever to deflect each base plate attachment cantilever engaged thereby toward the underlying base plate. This deflection of each base plate attachment cantilever forces a bottom surface of the load/unload ramp assembly into engagement with the first surface of the base plate to establish a secure interconnection between the load/unload ramp assembly and the base plate.

Various refinements exist regarding the features noted in relation to the subject second aspect of the present invention. Additional features may also be incorporated in the subject second aspect of the present invention as well. These refinements and additional features may exist individually or in any combination. Initially, each of the various features discussed above in relation to the first aspect of the present invention of the load/unload ramp assembly may be incorporated into this second aspect of the invention as well, alone or in any combination. Additional features in relation to the base plate may also be utilized by the second aspect. The base plate can include first and second mounting pads disposed on the first surface of the base plate. These first and second mounting pads may be generally recessed relative to a given boss of the base plate (i.e., disposed at a lower elevation). In other words, a given boss of the base plate may extend out and away from the first surface of the base plate a greater distance than its corresponding first and second mounting pads extend from the first surface of the base plate. In one embodiment, the first and second mounting pads are disposed in opposing relation. In another embodiment, the first and second mounting pads may be positioned on the first surface of the base plate so that a given boss of the base plate is positioned directly between the first and second mounting pads. In yet another embodiment, the first and second mounting pads may be generally disposed so that a reference line connecting the first and second mounting pads is perpendicular to a reference line connecting first and second base plate attachment cantilevers that may be utilized by the load/unload ramp assembly in relation to the second aspect.

In variations of the second aspect in which the ramp body of the load/unload ramp assembly incorporates at least one aperture shelf positioned about each fastener receptacle on the base plate, the aperture shelf/shelves preferably overlay(s) at least one of the corresponding first and second mounting pads. While the aperture shelf/shelves are positioned about the corresponding fastener receptacle, some amount of clearance preferably exists between the shaft of the fastener (that also extends into the fastener receptacle) and the corresponding aperture shelf/shelves. In other words, the head of a given fastener preferably does not interface with the corresponding aperture shelf/shelves when the load/unload ramp assembly is in an installed position. However, embodiments are contemplated wherein one both of the head and the shaft of the fastener can interface with the corresponding aperture shelf/shelves.

Ideally, the only contact between the first surface of the base plate and the bottom surface of the load/unload ramp assembly in the case of the second aspect (ignoring any contact via any alignment posts and corresponding alignment holes that may be utilized and that are discussed in more detail below) is between each mounting pad utilized by the base plate and a corresponding portion of the bottom surface of the load/unload ramp assembly. In other words, excluding the contact exhibited via the alignment posts, the bottom surface of the load/unload ramp assembly is preferably free from direct contact with any other portion of the first surface of the base plate other than the noted mounting pads.

In some variations of the second aspect of the present invention, the base plate has at least one alignment hole. Preferably, the base plate has first and second alignment holes, with a given boss of the base plate being positioned between the first and second alignment holes. Thus, the base plate can have first and second alignment holes positioned on opposite sides of a given boss of the base plate and first and second mounting pads positioned on opposite sides of such a boss of the base plate, so that a first reference line connecting the first and second alignment holes is substantially perpendicular to a second reference line connecting the first and second mounting pads. Preferably, the intersection point of these two lines generally corresponds with a central portion of the fastener receptacle of this boss of the base plate. The bottom surface of the load/unload ramp assembly can have at least one alignment post configured to fit into the complimentarily shaped alignment hole(s) of the base plate. Thus, upon installation of the load/unload ramp assembly onto the base plate, the alignment post(s) of the load/unload assembly can be disposed within the respective alignment hole(s) of the base plate to prevent sliding and/or rotational movement of the load/unload ramp assembly in relation to the base plate. Generally, each alignment post may have a circular, elliptical, or quadrilateral cross-sectional configuration, although other appropriate cross-sectional configurations are contemplated. In some variations of the invention, the bottom surface of the load/unload ramp assembly can include the alignment hole(s), and the base plate can include the corresponding alignment pin(s). Any way of maintaining alignment of the load/unload ramp assembly on the base plate may be utilized.

The shaft of each fastener associated with the second aspect may be threaded so as to be engaged with complimentarily threaded walls of the fastener receptacle of a given boss of the base plate. In one embodiment, a given base plate attachment cantilever is sufficiently spaced from a corresponding mounting boss and this boss is sufficiently sized such that the shaft of the fastener may be moved within the fastener receptacle to deflect the corresponding base plate attachment cantilever(s) until the head of the fastener engages an upper surface of the corresponding boss. Stated another way, in an installed position, the head of a given fastener may have a lower surface which is seated on the upper surface of a corresponding boss of the base plate, while at the same time having engaged the corresponding base plate attachment cantilever(s) so as to deflect the load/unload ramp assembly into forcible engagement with the underlying base plate. In other words, once installed, the lower surface of a given fastener head is in direct communication/engagement with the upper surface of the corresponding boss of the base plate. This allows a given fastener to exert a significant load on the base plate (by engaging a corresponding boss), while at the same time exerting a smaller (and more preferably a significantly smaller) load on each of the base plate attachment cantilevers that is engaged by the head of this fastener.

Any fastener associated with the second aspect and continuing with the foregoing (preferably via the lower surface of the head) may exert an axial force within a range of about 25 pounds up to about 400 pounds, and more preferably about 100 pounds up to about 200 pounds, on the upper surface of the corresponding boss of the base plate. In addition to affecting a force on at least the upper surface of the corresponding boss, the lower surface of the fastener head generally deflects each of the base plate attachment cantilever(s) engaged thereby so as to dispose the load/unload ramp assembly into forcible engagement with underlying portions of the first surface of the base plate as noted above. This deflection of each of the base plate attachment cantilevers again is generally in response to the shaft of the corresponding fastener being moved further within the fastener receptacle and a resulting engagement of the head of the fastener against deflectable portions of the base plate cantilevers that are associated with the particular fastener. In one embodiment, in an installed position, each base plate attachment cantilever generally deflects from about 4 mils to about 8 mils due to the force exerted by the head of the fastener. However, embodiments are contemplated in which the base plate attachment cantilever(s) exhibit deflection levels which fall outside the range of about 4 mils to about 8 mils. Generally, this axial force exerted on the base plate attachment cantilever(s) of the load/unload ramp assembly may be within a range of about 1 pound up to about 10 pounds, and yet maintain a sufficient interconnection between the load/unload ramp assembly and the base plate. Variations of the subject second aspect are also contemplated which exhibit axial forces outside the above-described ranges. Thus, the axial force that is exerted on the boss of the base plate may be generally greater, and preferably significantly greater, than the axial force that is exerted on each of the base plate attachment cantilever(s) as noted above.

A third aspect of the present invention is embodied in a disk drive having a load/unload ramp assembly disposed on a base plate of the disk drive. The load/unload ramp assembly has a ramp body that generally includes a load/unload ramp and at least one base plate attachment cantilever. This base plate attachment cantilever can have a first fixed end and a first free end. The load/unload assembly is affixed to the base plate of the disk drive utilizing at least one fastener having a head and a shaft. The shaft of a particular fastener generally extends past at least one base plate attachment cantilever of the load/unload ramp assembly and is securely disposed within a fastener receptacle of the base plate such that the head of the fastener exerts a force on an appropriate portion of the corresponding base plate attachment cantilever(s) to deflect this base plate attachment cantilever(s) toward the base plate, to in turn force a bottom surface of the load/unload ramp assembly into engagement with the base plate.

Various refinements exist regarding the features noted in relation to the subject third aspect of the present invention. Additional features may also be incorporated in the subject third aspect of the present invention as well. These refinements and additional features may exist individually or in any combination. Generally, each of the various features discussed in relation to any of the aspects of the present invention may be incorporated into this third aspect, alone or in any combination.

A fourth aspect of the present invention is embodied by a method of interconnecting a load/unload ramp assembly with a base plate of a disk drive. The method first includes disposing the load/unload ramp assembly on the base plate. A shaft of a fastener engages at least one base plate attachment cantilever of the load/unload ramp assembly and is directed into a fastener receptacle on the base plate. Prior to "loading" the base plate cantilever(s) with the fastener, at least a portion of a lower surface of each base plate attachment cantilever to be engaged by this fastener is spaced from an underlying portion of the base plate. The method additionally includes moving the shaft of the fastener further within the fastener receptacle and deflecting any base plate attachment cantilever engaged by the fastener such that a lower surface of the load/unload ramp assembly is directed into forcible engagement with an underlying portion of the base plate.

Various refinements exist regarding the features noted in relation to the subject fourth aspect of the present invention. Additional features may also be incorporated in the subject fourth aspect of the present invention as well. These refinements and additional features may exist individually or in any combination. Generally, each of the various features discussed above in relation to the first, second, and third aspects of the present invention may be incorporated into this fourth aspect, alone or in any combination.

DETAILED DESCRIPTION

Figure 1:
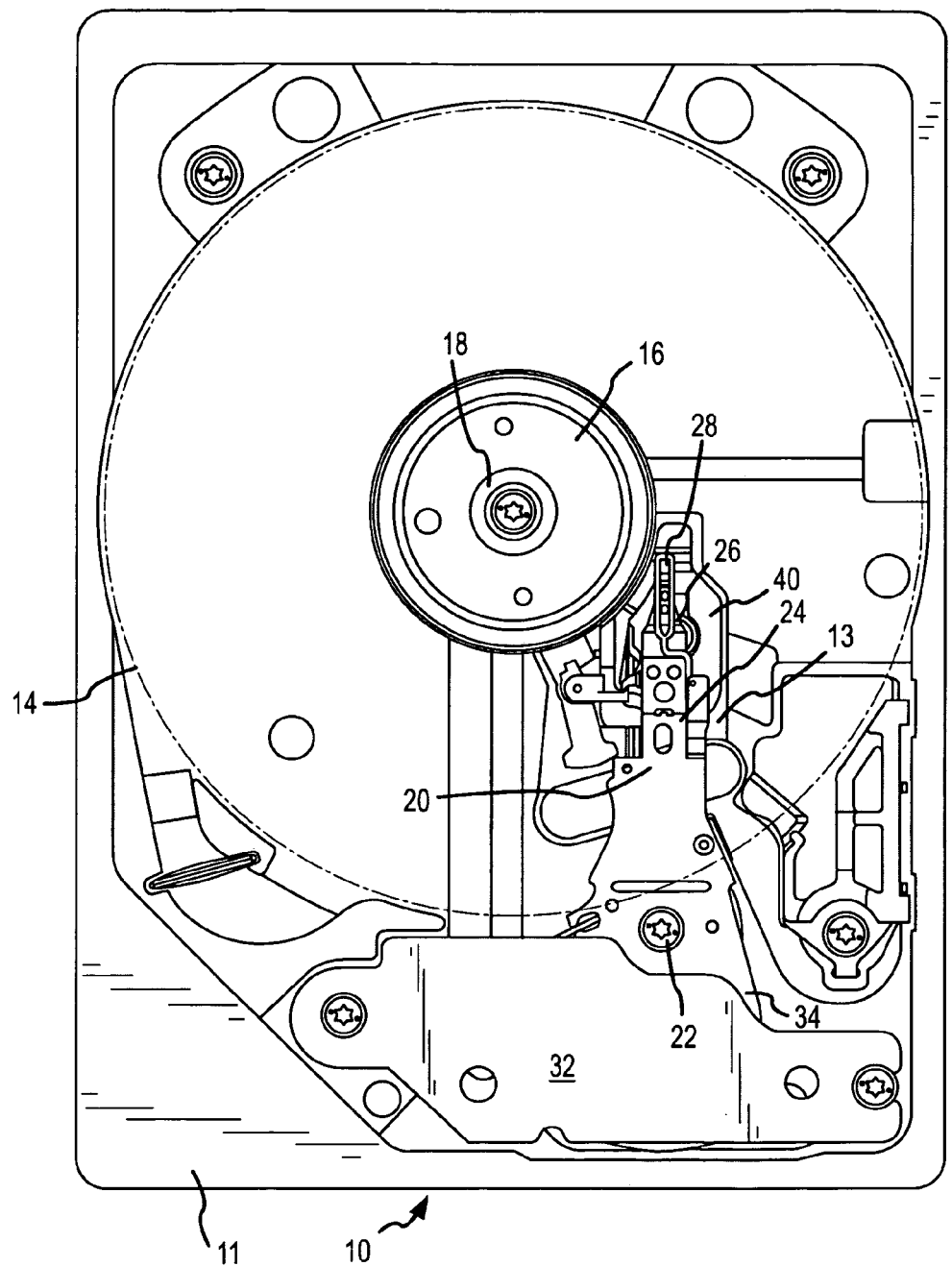
FIG. 1 is a top view of one embodiment of a disk drive with a cover plate having been removed.
Figure 2:
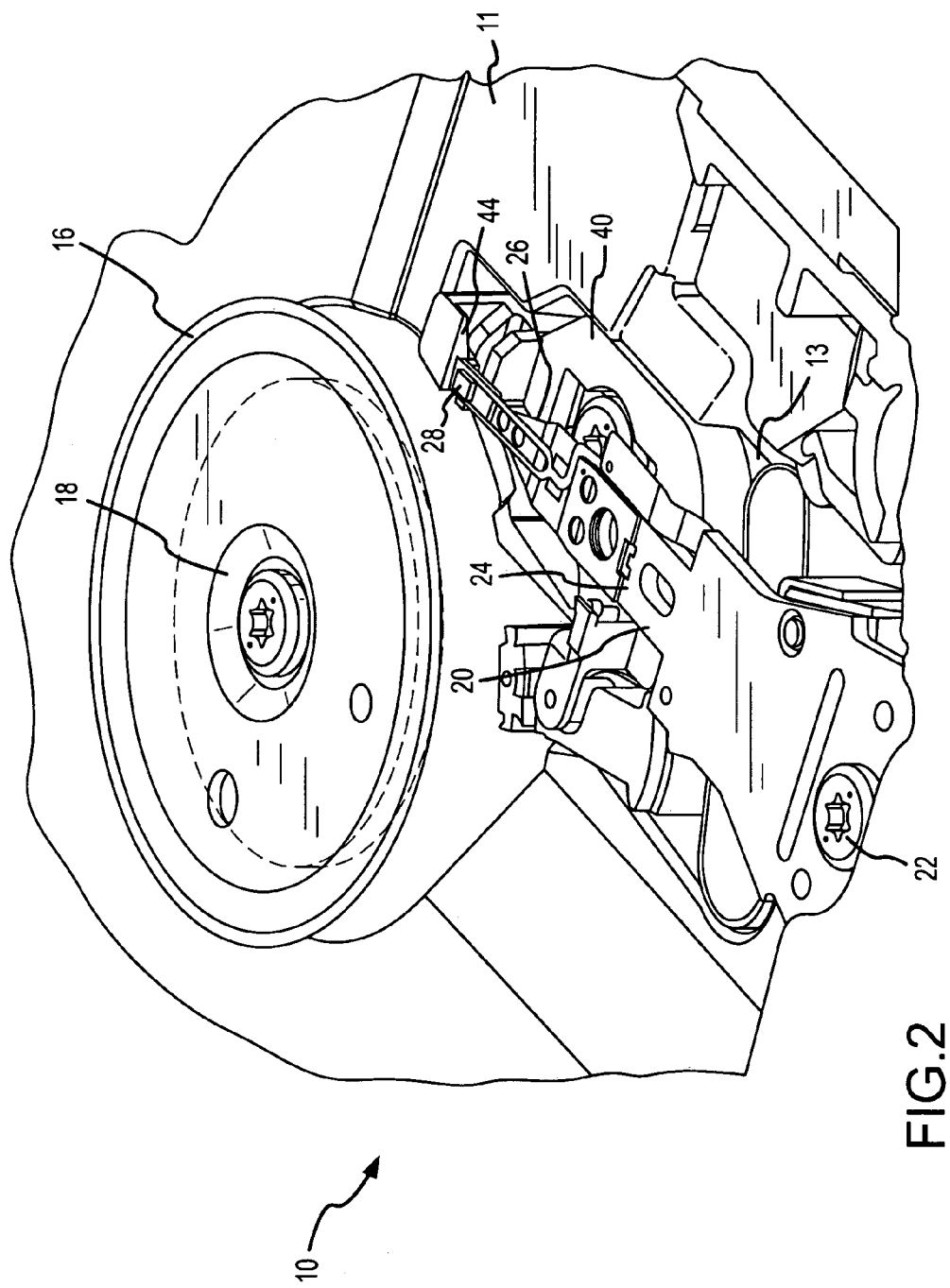
FIG. 2 is a magnified perspective view of the disk drive of FIG. 1 with the data storage disk removed.

The present invention will now be described in relation to the accompanying drawings, which at least assist in illustrating the various pertinent features thereof. FIGS. 1 and 2 illustrate various components of one embodiment of a disk drive 10 that generally includes a base plate 11 having a first surface 13. A cover (not shown) is typically disposed atop the base plate 11 and is detachably attached thereto to define an enclosed space for the various disk drive components. The disk drive 10 further includes a data storage disk 14 of any appropriate computer-readable data storage media. However, the data storage disk 14 of disk drive 10 has been removed to show various other disk drive components; accordingly, the data storage disk 14 is shown in dashed outline only in FIG. 1, and is not illustrated in FIG. 2. This data storage disk 14 is generally mounted on a spindle 16, which in turn is rotatably interconnected with the base plate 11 and/or cover of the disk drive 10. Generally, the data storage disk 14 is made from glass, ceramic, or one or more of a variety of metals. A spindle motor 18 is coupled to the spindle 16 to spin the data storage disk 14 at an appropriate rate.

The disk drive 10 also includes an actuator arm assembly 20 which pivots about a pivot bearing 22, which in turn is rotatably supported by the base plate 11 of the disk drive 10 and/or cover. FIGS. 1 and 2 illustrate that the actuator arm assembly 20 is positioned between the base plate 11 and the data storage disk 14 (i.e., under the data storage disk 14). This actuator arm assembly 20 generally includes a rigid actuator arm 24 which extends out from near the pivot bearing 22 and a suspension 26 attached to an end of the actuator arm 24 most remote from the pivot bearing 22. A head 28 is disposed at or near an end of each suspension 26. The head 28 typically includes a body (e.g., slider) and at least one transducer (not shown) that exchanges signals with the corresponding data storage disk 14. The head 28 is interconnected with the suspension 26 of the actuator arm assembly 20 so that the head 28 generally faces away from the base plate 11 and toward the cover (not shown) of the disk drive 10. Stated another way, the head 28 is positioned on the actuator arm assembly 20 in such a manner as to allow the head 28 to operatively interface with a data storage surface of the data storage disk 14 that faces the base plate 11. Accordingly, the disk drive 10 also includes a load/unload ramp assembly 40 having a load/unload ramp 44 which slopes away from the data storage disk 14 and toward the base plate 11 of the disk drive 10 so as to dispose the head 28 and its corresponding data storage disk 14 in spaced relation when the head 28 is "parked" (i.e., at the termination of disk drive operations). In the illustrated embodiment, the load/unload ramp assembly 40 is disposed under the data storage disk 14 and at least generally toward a radially inward portion thereof.

Additionally, a voice coil motor (VCM) 32 at least operatively interfaces with the actuator arm assembly 20 at a distal end 34 that is opposite that of the head 28. The VCM 32 imparts motion to the actuator arm assembly 20, and thus to the head 28 (e.g. in response to a control signal). The VCM 32 generally consists of a magnet(s) and a coil of fine wire, although other configurations are contemplated. Notwithstanding the configuration of the disk drive 10 just described, the manner of interconnecting a load/unload ramp assembly with a base plate that will now be discussed may be incorporated into any appropriate disk drive configuration.

Figure 3:
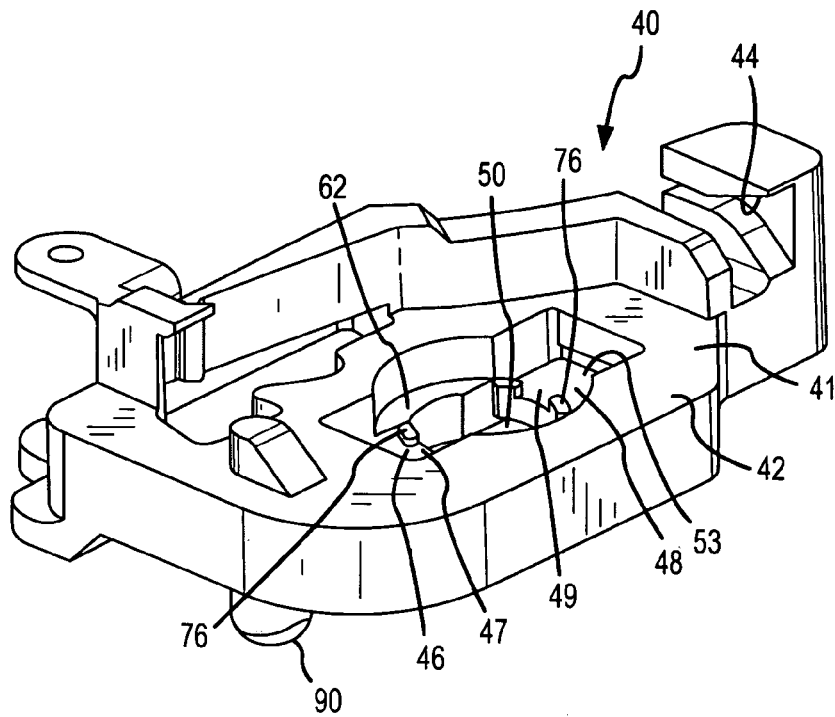
FIG. 3 is a perspective view illustrating a top portion of the load/unload ramp assembly used by the disk drive of FIG. 1.
Figure 4:
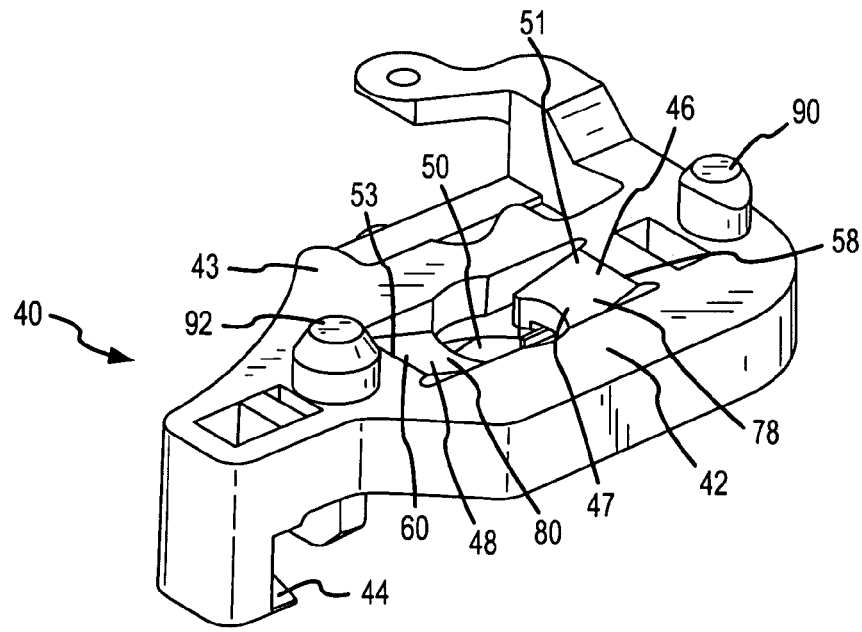
FIG. 4 is a perspective view showing a bottom portion of the load/unload ramp assembly used by the disk drive of FIG. 1.

FIGS. 3-4 illustrate further details of the load/unload ramp assembly 40 that is interconnectable with the base plate 11 of the disk drive 10. The load/unload ramp assembly 40 is configured in a manner so as to allow the same to be fabricated from plastic, although other materials could be utilized. Generally, the load/unload ramp assembly 40 has a ramp body 42 that includes a load/unload ramp 44 which generally assists in separating the head 28 from contact with the data storage disk 14 when the head 28 is parked. Generally, as disk drive operations are terminated, the voice coil motor 32 pivots the actuator arm assembly 20 so as to move the head 28 toward a radially inward location on its corresponding data storage disk 14 (or at least generally toward the spindle 16). During this motion, the head 28 engages the load/unload ramp 44. Continued movement of the actuator arm assembly 20 in the noted direction thereby directs the head 28 away from the data storage disk 14 and at least generally toward the base plate 11 of the disk drive 10. Features may be incorporated into the load/unload ramp assembly 40 so as to attempt to retain the actuator arm assembly 20 in the parked position until disk drive operations are subsequently re-initiated.

The load/unload ramp assembly 40 generally is configured to enhance one or more aspects of its interconnection with the base plate 11. In this regard, the load/unload ramp assembly 40 includes first and second base plate attachment cantilevers 46, 48, respectively, which extend at least generally toward each other and have respective first and second free ends 47, 49, and respective first and second fixed ends 51, 53. Any number of base plate attachment cantilevers may be utilized by the load/unload ramp assembly 40, including a single base plate attachment cantilever and more than two base plate attachment cantilevers. Each respective fixed end 51, 53 is in direct contact with the ramp body 42. In other words, the fixed end (e.g. 51, 53) of each base plate attachment cantilever 46, 48 is in uninterrupted engagement with the ramp body 42. Conversely, the respective first and second free ends 47, 49 of the base plate attachment cantilevers 46, 48 are disposed on respective opposite ends of the respective attachment cantilevers 46, 48. In other words, the first fixed end 51 of the first base plate attachment cantilever 46 is disposed at an end of the cantilever 46 adjacent the ramp body 42; while the first free end of the first base plate attachment cantilever 46 is disposed at an end opposite that of the first fixed end 51 and most remote from any attachment to the first base plate cantilever 46. Similarly, the second fixed end 53 of the second base plate attachment cantilever 48 is disposed at an end of the cantilever 48 adjacent the ramp body 42; while the second free end of the second base plate attachment cantilever 48 is disposed at an end opposite that of the second fixed end 53 and most remote from any attachment to the second base plate cantilever 48.

The first and second free ends 47, 49 of the first and second base plate attachment cantilevers 46, 48, respectively, are disposed in spaced relation to generally define a fastener aperture 50. This fastener aperture 50 provides a space so that a shaft 54 of a fastener 52 can pass between the first and second free ends 47, 49 of the first and second base plate attachment cantilevers 46, 48, respectively and into the base plate 11. In other words, the fastener aperture 50 is generally an open area, at least part of which is defined between the first and second base plate attachment cantilevers 46, 48. The first and second free ends 47, 49 of the first and second base plate attachment cantilevers 46, 48 are spaced apart a defined distance that enables the shaft 54 (shown in FIG. 7) of the fastener 52 to pass through the at least generally round fastener aperture 50, and yet that enables a head 56 of the fastener 52 to "catch" on or at least otherwise engage the first and second base plate attachment cantilevers 46, 48, preferably at or near at least their first and second free ends 47, 49, respectively, to exert a downwardly-directed force (or at least generally toward the base plate 11) on the first and second base plate attachment cantilevers 46, 48. The first and second base plate attachment cantilevers 46, 48 are disposed in opposing relation so that the first base plate attachment cantilever 46 is positioned on a side of the fastener aperture 50, and the second base plate attachment cantilever 48 is positioned on anther side of the fastener aperture 50 opposite the first base plate attachment cantilever 46.

The first and second base plate attachment cantilevers 46, 48 each have a pair of fastener head contact protrusions 76 positioned on an upper surface 66, 68 of each of the first and second base plate attachment cantilevers 46, 48, respectively. These fastener head contact protrusions 76 are positioned at least generally at the respective first and second free ends 47, 49, respectively, of each of the first and second base plate attachment cantilevers 46, 48. Each fastener head contact protrusion 76 at least generally projects out and extends away from adjacent portions of the respective upper surface 66, 68 of the first and second base plate attachment cantilevers 46, 48. These contact protrusions 76 are illustrated as having an oblong/elliptical-type cross-sectional configuration; however other cross-sectional configurations (e.g., circular, triangular, quadrilateral) will be obvious to those of ordinary skill in the art. In an installed position, a lower surface 57 of the head 56 of the fastener 52 generally engages the fastener head contact protrusions 76 and avoids contact with the remainder of the upper surfaces 66, 68 of the first and second base plate attachment cantilevers 46, 48. The protrusions 76 on each base plate attachment cavalier 46, 48 are spaced such that they engage the head 56 of the fastener 52 at two displaced locations. However, other embodiments may have only one contact protrusion 76 on each of the first and second base plate attachment cantilevers 46, 48. In such embodiments, the contact protrusion could occupy entire free end (e.g. 47, 49) of each of the respective first and second base plate attachment cantilevers 46, 48. Other embodiments could have more than two contact protrusions 76 on each of the first and second base plate attachment cantilevers 46, 48. Yet other embodiments could have first and second base plate attachment cantilevers 46, 48 which are free of any fastener head contact protrusions 76. In such embodiments, in an installed position, a lower surface 57 of the head 56 of the fastener 52 would directly engage the first and second upper surfaces 66, 68 of the respective first and second base plate attachment cantilevers 46, 48.

In addition to the first and second upper surfaces 66, 68, the first and second base plate attachment cantilevers 46, 48 have respective first and second lower surfaces 78, 80. These lower surfaces 78, 80 are illustrated as being disposed in non-parallel relation to their corresponding upper surface 66, 68, respectively to define a wedge-shaped profile or the like for the first and second base plate attachment cantilevers 46, 48. That is, the thickness of the first and second base plate attachment cantilevers 46, 48 at their respective free ends 47, 49 is less than the thickness of the cantilevers 46, 48 at their respective fixed ends 51, 53. Other configurations may be utilized for the first and second base plate attachment cantilevers 46, 48. Moreover, in one embodiment the major axis of the cantilevers 46, 48 is disposed at an angle to the horizontal prior to engaging the fastener 52 against the cantilevers 46, 48. That is, in an undeflected state and in one embodiment, the free ends 47, 49 of the cantilevers 46, 48 are disposed at a higher elevation and their corresponding fixed end 51, 53. Other "static" profiles could be utilized for the cantilevers 46, 48. The ramp body 42 also has first and second aperture shelves 62, 64, respectively, positioned about the fastener aperture 50 and recessed relative to upper surfaces 66, 68, respectively, of each of the first and second base plate attachment cantilevers 46, 48. In other words, in an installed position, the distance between first and second aperture shelves 62, 64 and a reference plane in which the base plate 11 at least generally extends is less than the distance between the upper surfaces 66, 68 of the first and second base plate attachment cantilevers 46, 48 and this reference plane. As with the first and second base plate attachment cantilevers 46, 48, the first and second aperture shelves 66, 68 are disposed in opposing relation. These aperture shelves 66, 68 are generally arcuately-shaped/concave and define at least a portion of the fastener aperture 50 of the ramp body 42 as well. In particular and referring to FIG. 6, a first reference line 70 connecting the first and second base plate attachment cantilevers 46, 48 is generally perpendicular to a second reference line 72 connecting the first and second aperture shelves 47, 49. An intersection point 74 of these two reference lines 70, 72 generally corresponds with a central portion of the fastener aperture 50 of the load/unload ramp assembly 40. It should be appreciated that the load/unload ramp assembly 40 may be in currently formed or of one-piece construction. In one embodiment, the load/unload ramp assembly 40 may be formed by injection molding techniques utilizing a suitable plastic, such as acetal or liquid crystal polymer (LCP). However, other manufacturing techniques and/or materials could be utilized in relation to the load/unload ramp assembly 40.

Figure 5:
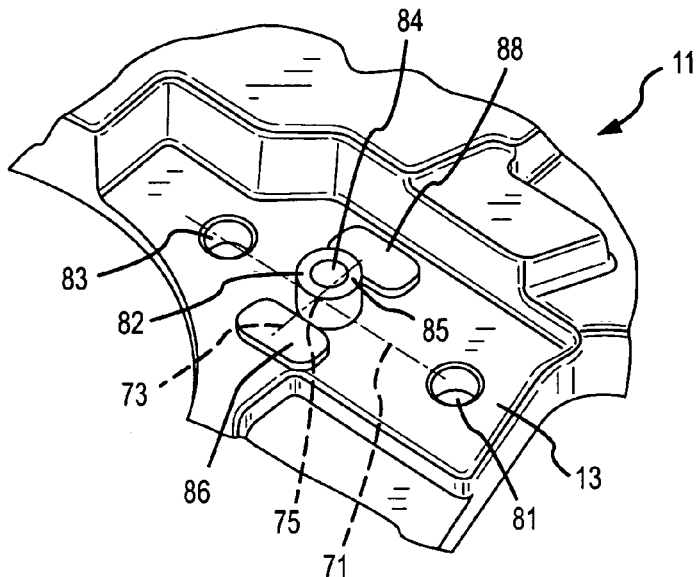
FIG. 5 is a perspective view of a portion of the base plate used by the disk drive of FIG. 1 and that is configured to receive the load/unload ramp assembly of FIGS. 3-4.
Figure 6:
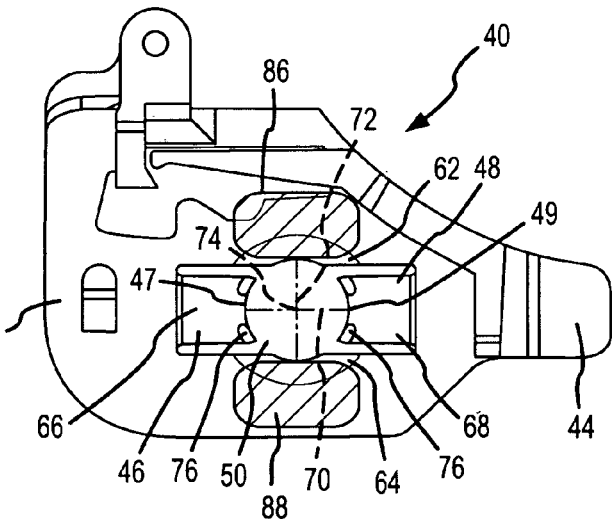
FIG. 6 is a top view of the load/unload ramp assembly of FIGS. 3-4, illustrating how the load/unload ramp assembly relates to mounting pads of the base plate of FIG. 5 that are positioned beneath the load/unload ramp assembly.

Referring to FIGS. 5-6, the first surface 13 of the base plate 11 of the disk drive 10 includes a boss 82 which projects away from the first surface 13 and which includes a fastener receptacle 84 for the fastener 52. Generally, this boss 82 is preferably integral with the base plate 11. In other words, the base plate 11 and the boss 82 are preferably a one-piece unit, as is the entirety of the base plate 11 (e.g., formed by casting and/or machining such that there are no joints in the base plate 11). The fastener receptacle 84 of the boss 82 generally has threaded walls 94 designed to cooperatively engage the threaded shaft 54 of the fastener 52 upon insertion of the fastener 52 into the fastener receptacle 84 (see FIG. 7). The base plate 11 also includes first and second mounting pads 86, 88 disposed in opposing relation on the first surface 13 of the base plate 11, with the boss 82 being positioned between the first and second mounting pads 86, 88. Thus, a reference line 73 connecting the first and second mounting pads 86, 88 generally extends through the boss 82 of the base plate 11. The first and second mounting pads 86, 88 are recessed relative to the upper surface of the boss 82 of the base plate 11. In other words, the upper surface of the boss 82 of the base plate 11 extends out and away from the first surface 13 of the base plate 11 a greater distance than the first and second mounting pads 86, 88 extend from the base plate 11. These first and second mounting pads 86, 88 are generally designed to stabilize the load/unload ramp assembly 40 when installed on the base plate 11 and/or to minimize the couple created by the force of the fastener 52 which can contribute to bending/deformation of the ramp body 42 and, in turn, displacement of the ramp 44. Thus, the first and second mounting pads are positioned on the first surface 13 of the base plate 11 so that they abut the boss 82 of the base plate 11. Accordingly, the first and second mounting pads 86, 88 are disposed about the boss 82 of the base plate 11 so that the reference line 72 passing through the first and second mounting pads 86, 88 is perpendicular to the reference line 70 connecting the first and second base plate attachment cantilevers 46, 48 of the load/unload ramp assembly 40; thus, upon installation of the load/unload ramp assembly 40 onto the base plate 11, the aperture shelves 62, 64 overlay at least portions of the first and second mounting pads 86, 88. Accordingly, when the load/unload assembly 40 is installed on the first surface 13 of the base plate 11, the bottom surface 43 of the load/unload ramp assembly found underneath the aperture shelves 62, 64 will be pressed against the mounting pads 86, 88 to prevent the ramp body 42 from bending to an undesired degree when installing the load/unload ramp assembly 40 onto the base plate 11.

The base plate 11 also has first and second alignment holes 81, 83, with the boss 82 of the base plate 11 being positioned between the first and second alignment holes 81, 83. Thus, the base plate 11 has first and second alignment holes 81, 83 positioned on opposite sides of the boss 82 of the base plate 11 and first and second mounting pads 86, 88 positioned on opposite sides of the boss 82 of the base plate 11, so that a reference line 71 connecting the first and second alignment holes 81, 83 is substantially perpendicular to another reference line 73 connecting the first and second mounting pads 86, 88. Preferably, the intersection point 75 of these two lines 71, 73 generally corresponds with a central portion of the fastener receptacle 84 of the boss 82 of the base plate 11. Other locations may be appropriate for the alignment holes 81, 83.

Referring back to FIG. 4, the bottom surface 43 of the load/unload ramp assembly 40 has first and second alignment posts 90, 92 configured to fit into the respective first and second alignment holes 81, 83 of the base plate 11 illustrated in FIG. 5. Generally, the first and second alignment posts 90, 92 are complimentarily shaped to fit within the respective first and second alignment holes 81, 83 without allowing significant rotational movement (e.g., clocking) of the ramp body 42 upon installation of the load/unload ramp assembly 40 onto the base plate 11. Put another way, upon installation of the load/unload ramp assembly 40 onto the base plate 11, the first and second alignment posts 90, 92 of the load/unload assembly 40 are disposed within the respective first and second alignment holes 81, 83 of the base plate 11 to prevent any significant sliding and/or rotational movement of the load/unload ramp assembly 40 in relation to the base plate 11. Accordingly, each of these alignment posts 90, 92 can have a variety of cross-sectional configurations which would enable each of these alignment posts 90, 92 to function in preventing rotational movement of the ramp body 42 including, but not limited to, circular, elliptical, triangular, and quadrilateral cross-sectional configurations.

Figure 7:
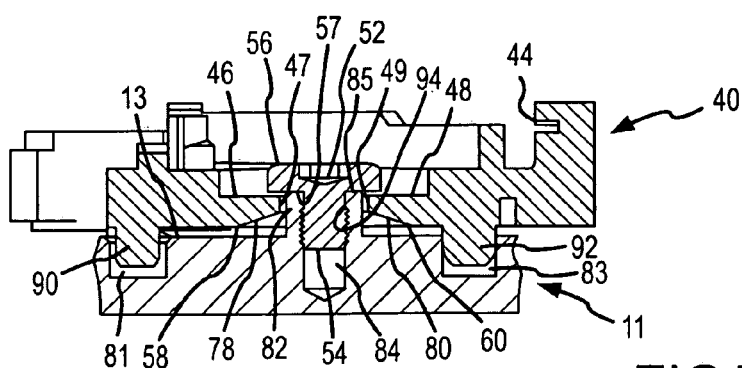
FIG. 7 is a cross-sectional view of the load/unload ramp assembly of FIGS. 3-4 wherein mounted on the base plate of FIG. 5.

Referring now to FIG. 7, the load/unload ramp assembly 40 has been installed on the base plate 11. The shaft 54 of the fastener 52 extends through the fastener aperture 50 between the first and second free ends 47, 49, and the head 56 of the fastener 52 exerts a force at least on the first and second free ends 47, 49. As a result, the first and second base plate attachment cantilevers 46, 48 are generally deflected toward the base plate 11 to forcibly engage the load/unload ramp assembly 40 against the base plate 11. In one embodiment, the first and second base plate attachment cantilevers 46, 48 are driven or deflected into forcible engagement with the base plate 11 at least at the respective first and second base plate engagement portions 58, 60 of the respective first and second attachment cantilevers 46, 48. In the illustrated embodiment and upon full engagement of the fastener 52, the respective upper surfaces 66, 68 of each of the first and second base plate attachment cantilevers 46, 48 is positioned in at least substantially horizontal relation when the load/unload ramp assembly 40 is installed on the base plate 11, although such need not be the case. Prior to the installation of the load/unload ramp assembly 40 onto the base plate 11 and as noted above, the respective upper surfaces 66, 68 of each of the respective first and second base plate attachment cantilevers 46, 48 may be at least generally angled upward toward the top surface 41 of the ramp body 42; however, the respective first and second base plate attachment cantilevers 46, 48 are bent or deflected down toward to the bottom surface of the ramp body 42 upon tightening of the fastener 52 into the fastener receptacle 84 of the boss 82. Other embodiments are contemplated wherein each of the upper surfaces 66, 68 of the respective first and second base plate attachment cantilevers 46, 48 remain substantially coplanar prior to installation, and upon installation, bend downward to exhibit an angle disposed toward the bottom surface 43 of the ramp body 42. What is important is that the first and second base plate attachment cantilevers 46, 48 are deflected at least generally toward the base plate 11 by the fastener 52, so as to forcibly engage the load/unload ramp assembly 40 with the base plate 11.

In addition, the lower surfaces 78, 80 of each of the first and second base plate attachment cantilevers 46, 48 generally extend at least generally upwardly progressing toward the respective first/second free end 66, 68 of respective first/second base plate attachment cantilever 46, 48. Even after the load/unload ramp assembly 40 has been installed on the base plate 11, a space may exist between at least portions of the respective lower surfaces 78, 80 of the first and second base plate attachment cantilevers 46, 48 and the first surface 13 of the base plate 11. However, in the embodiment illustrated in FIG. 7, at least the first and second base plate engagement portions 58, 60 of the respective first and second attachment cantilevers 46, 48 are forcibly engaged with the first surface 13 of the base plate 11 when the load/unload ramp assembly 40 is properly installed on the first surface 13 of the base plate 11. In other embodiments, the first and second base plate attachment cantilevers (e.g. 46, 48) do not have engagement portions (e.g. 58, 60) which forcibly engage the first surface 13 of the base plate 11. In such embodiments that lack engagement portions (e.g. 58, 60), the axial force of the head 56 of the fastener 52 on the upper surfaces 66, 68 of the respective first and second base plate attachment cantilevers 46, 48 deflects the first and second base plate attachment cantilevers 46, 48 with a sufficient force to fixedly engage the bottom surface 43 of the load/unload ramp assembly 40 against the respective mounting pads 86, 88 to secure the load/unload assembly 40 onto the base plate 11.

The shaft 54 of the fastener 52 is threadingly engaged with the complimentarily threaded walls 94 of the fastener receptacle 84 of the boss 82 of the base plate 1. Usually, the shaft 54 of the fastener 52 is generally moved further within the fastener receptacle 84 until the head 56 of the fastener 52 engages an upper surface 85 of the boss 82. Stated another way, in an installed position, the head 56 of the fastener 52 generally has a lower surface 57 which is seated on the upper surface 85 of the boss 82 of the base plate 11. In other words, once installed, the lower surface 57 of the fastener head 56 is in direct communication/engagement with the upper surface 85 of the boss 82 of the base plate 11, while at the same time engaging the first and second base plate attachment cantilevers 46, 48.

This fastener (preferably via the lower surface 57 of the head 56) 52 generally exerts an axial force within a range of about 25 pounds up to about 400 pounds, and more preferably about 100 pounds up to about 200 pounds, on the upper surface 85 of the boss 82 of the base plate 11. In addition to affecting a force on at least the upper surface 85 of the boss 82, the lower surface 57 of the fastener head 56 generally deflects the first and second base plate attachment cantilevers 46, 48 which urges at least portions of the bottom surface 43 of the load/unload ramp assembly 40 into forcible engagement with underlying portions of the first surface 13 of the base plate 11. This deflection of the first and second base plate attachment cantilevers 46, 48 which urges at least portions of the bottom surface 43 of the load/unload ramp assembly 40 into forcible engagement with underlying portions of the base plate 11 is generally in response to the shaft 54 of the fastener 52 being moved further within the fastener receptacle 84. Accordingly, in an installed position, the first and second base plate attachment cantilevers 46, 48 each generally deflect from about 4 mils to about 8 mils in one embodiment due to the force exerted by the head 56 of the fastener 52 on the first and second base plate attachment cantilevers 46, 48. Generally, this axial force exerted on the first and second base plate attachment cantilevers 46, 48 of the load/unload ramp assembly 40 is within a range of about 1 pound up to about 10 pounds. Thus, the axial force which is exerted on the boss 82 of the base plate 11 by the fastener 52 in the fully installed position is generally greater, and preferably significantly greater, than the axial force which is exerted on each of the first and second base plate attachment cantilevers 46, 48 by the fastener 52 in the fully installed position. This significantly reduces the potential for the fastener 52 retracting out of the fastener receptacle 84 over the life of the disk drive 10. Moreover, this significantly reduces the load that is applied to the load/unload ramp assembly 40 to retain the same on the base plate 11, so as to reduce the effects of creep that may occur over the life of the disk drive 10.

Those skilled in the art will now see that certain modifications can be made to the apparatus and methods herein disclosed with respect to the illustrated embodiments, without departing from the spirit of the present invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A method of interconnecting a load/unload ramp assembly with a base plate of a disk drive, the method comprising the steps of:
    disposing said load/unload ramp assembly on said base plate;
    passing a shaft of a fastener through a space past a first free end of a first base plate attachment cantilever of said load/unload ramp assembly and into a fastener receptacle on said base plate;
    moving said shaft further within said fastener receptacle; and
    deflecting said first base plate attachment cantilever to in turn direct said load/unload ramp assembly into forcible engagement with an underlying portion of said base plate.

2. A method, as claimed in claim 1, wherein said disposing step comprises disposing first and second alignment posts of said load/unload assembly within first and second alignment holes of said base plate.

3. A method, as claimed in claim 1, wherein said moving step comprises threadingly engaging said shaft of said fastener with complimentarily threaded walls of said fastener receptacle.

4. A method, as claimed in claim 1, wherein said deflecting step is responsive to said moving step.

5. A method, as claimed in claim 1, wherein said deflecting step comprises engaging a head of said fastener against an upper surface of said first base plate attachment cantilever.

6. A method, as claimed in claim 1, wherein said base plate comprises a protruding boss, wherein said fastener receptacle is disposed within said protruding boss, wherein said moving step is executed until a head of said fastener engages an upper surface of said boss.

7. A method, as claimed in claim 6, wherein said moving step comprises exerting an axial force on said protruding boss that is greater than an axial force exerted on said first base plate attachment cantilever.

8. A method, as claimed in claim 7, wherein said moving step comprises exerting an axial force of about 25 pounds up to about 400 pounds on said protruding boss, and wherein said deflecting step comprises exerting an axial force of about 1 pound up to about 10 pounds on said first base plate attachment cantilever.

9. A method, as claimed in claim 1, wherein said deflecting step comprises deflecting said first base plate attachment cantilever by an amount with a range of about 4 mils to about 8 mils.

10. A method, as claimed in claim 1, wherein said passing step further comprises passing said shaft of said fastener through a fastener aperture defined at least in part by said first free end of said first base plate attachment cantilever and a second free end of a second base plate attachment cantilever of said load/unload ramp assembly, wherein said method further comprises the step of deflecting said second base plate attachment cantilever simultaneously with said deflecting said first base plate attachment member step to in turn direct said load/unload ramp assembly into forcible engagement with said underlying portion of said base plate.

* * * * *